United States Patent [19]

Heim et al.

[11] 4,438,619
[45] Mar. 27, 1984

[54] CORN HARVESTER COMBINE WITH MEANS FOR PICKING UP LOOSE EARS

[76] Inventors: Edward J. Heim, R.R. #2, Box 124B, Hoxie, Kans. 67740; Stephen B. Hennessey, 216 SE. Greenroad, Tecumseh, Kans. 66542; Curtis R. Janssen, R.R. #2, Solomon, Kans. 67480; R. Shannon Johnson, 4010 N. Brandywine Dr., Apt. 1023, Peoria, Ill. 61614; Richard B. League, 917 Moro, Manhattan, Kans. 66502; Ronald D. Shinogle, 4010 N. Brandywine Dr., Apt. 1310, Peoria, Ill. 61614; Richard A. Weber, 513½ Main, Seneca, Kans. 66538

[21] Appl. No.: 476,279

[22] Filed: Mar. 17, 1983

[51] Int. Cl.³ ............................................. A01D 45/02
[52] U.S. Cl. ...................................... 56/119; 56/364; 56/320; 56/98
[58] Field of Search ..................... 56/15.8, 34, 80, 82, 56/84, 88, 94, 98, 106, 109, 320, 320.1, 364

[56] References Cited
U.S. PATENT DOCUMENTS

| | | | |
|---|---|---|---|
| 2,302,881 | 11/1942 | Oehler | 56/119 |
| 2,891,373 | 6/1959 | Bauer et al. | 56/328 R |
| 3,380,232 | 4/1968 | Jezek | 56/34 |
| 3,719,034 | 3/1973 | Lange | 56/119 |
| 4,172,500 | 10/1979 | Smith | 56/130 |
| 4,353,201 | 10/1982 | Pierce et al. | 56/364 |

Primary Examiner—Gene Mancene
Assistant Examiner—David I. Tarnoff
Attorney, Agent, or Firm—McCaleb, Lucas & Brugman

[57] ABSTRACT

An attachment for a corn harvester to pick up loose ears off the ground. In the embodiment described, novel pickup and conveyor mechanism are substituted for the forward, pointed snout members at the forward ends of the longitudinally extending hoods which are part of the row dividers in a conventional corn head and which define throats aligned with rows of corn. The attachment cooperates with the conventional stripper plates, gathering chains, and snapping rolls, making the harvester doubly effective in that it collects loose ears from the ground as well as picking them from the stalks.

15 Claims, 20 Drawing Figures

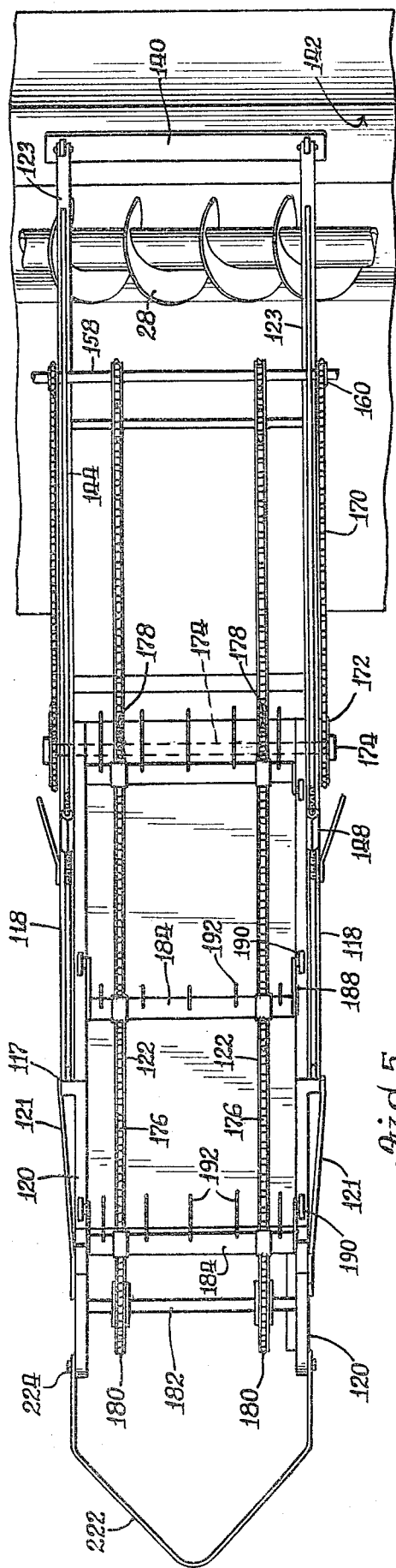
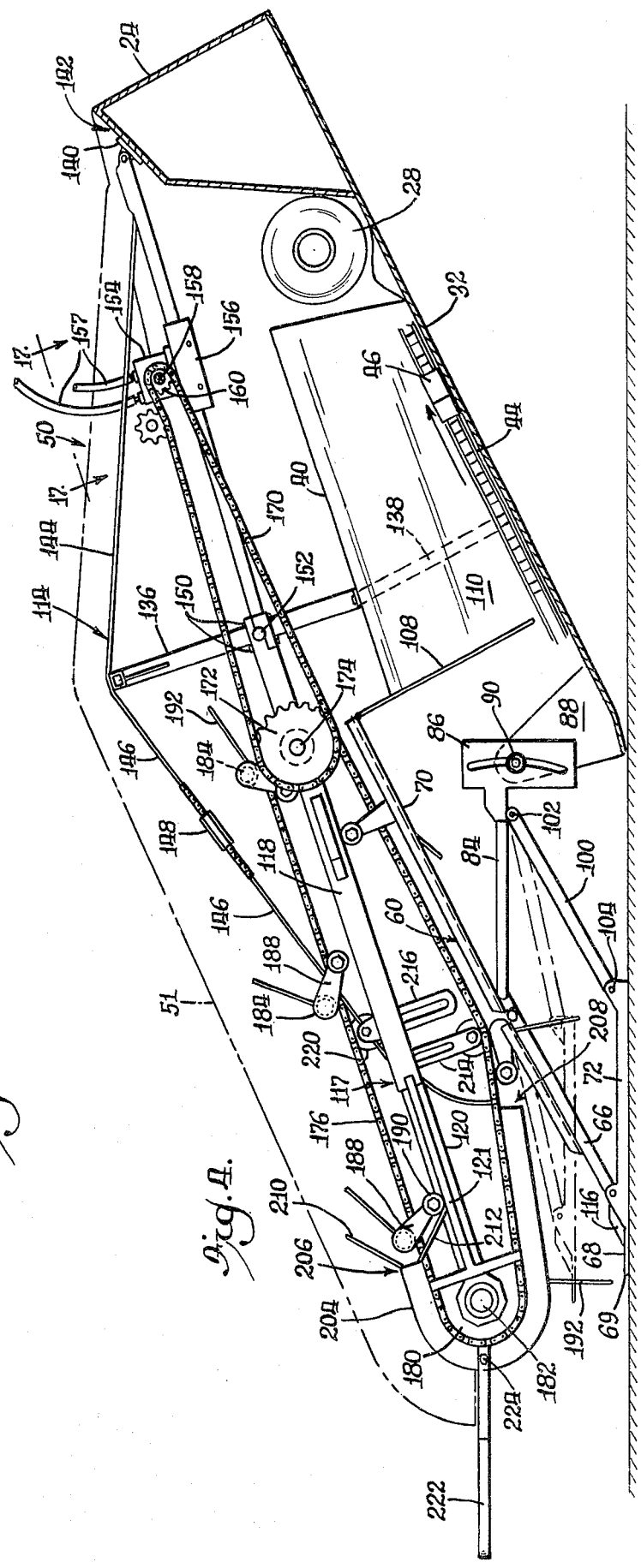

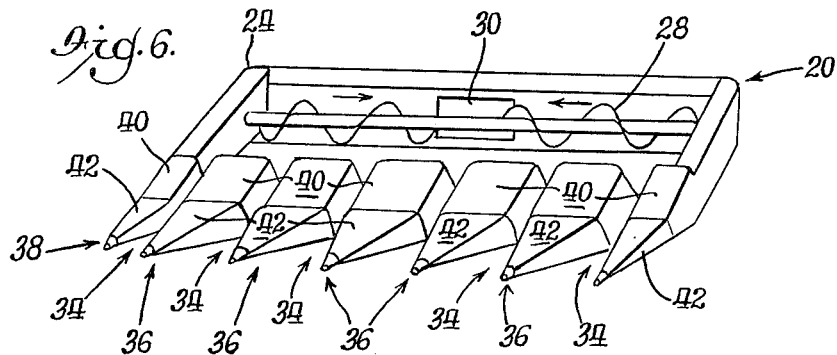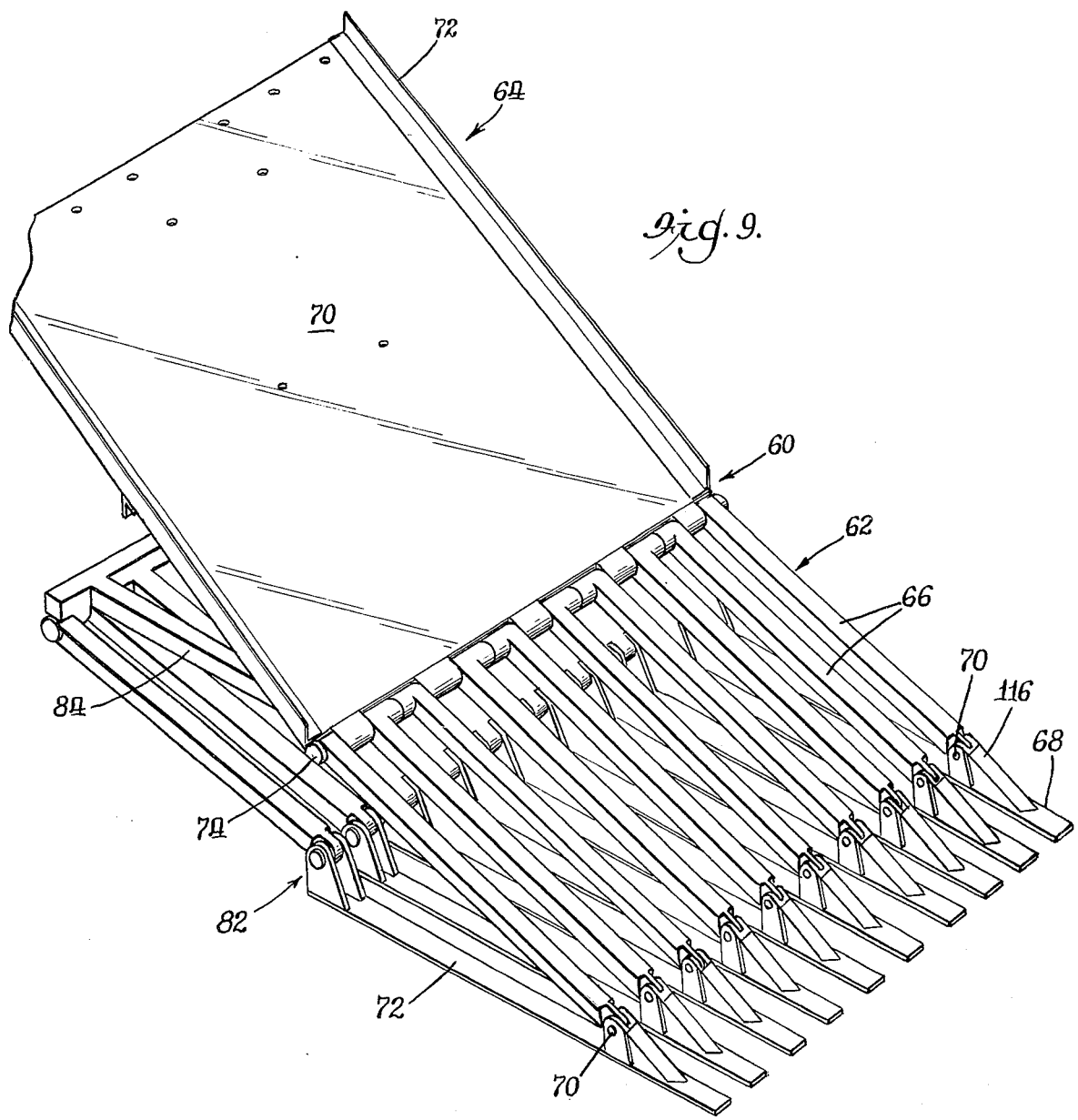

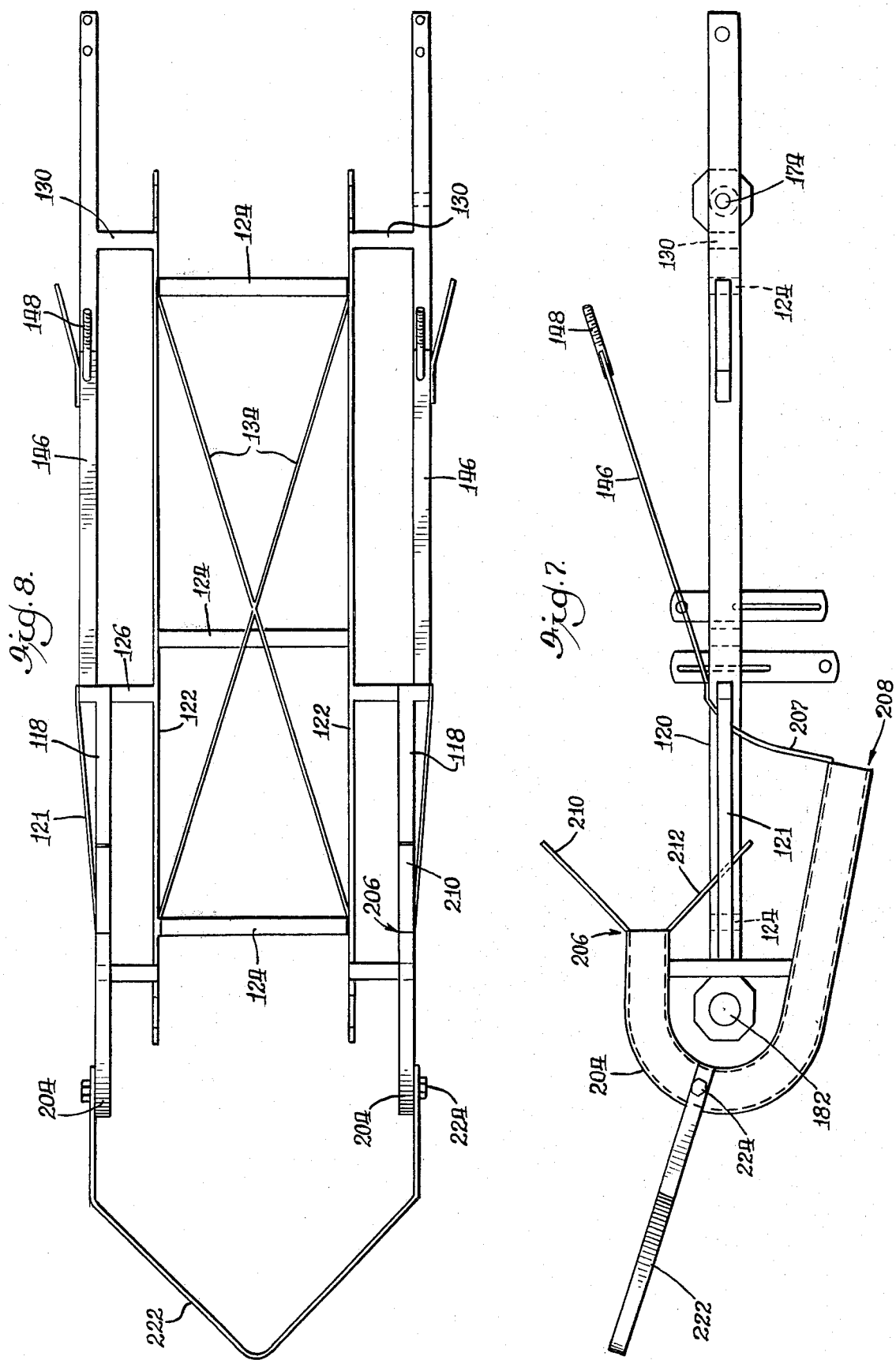

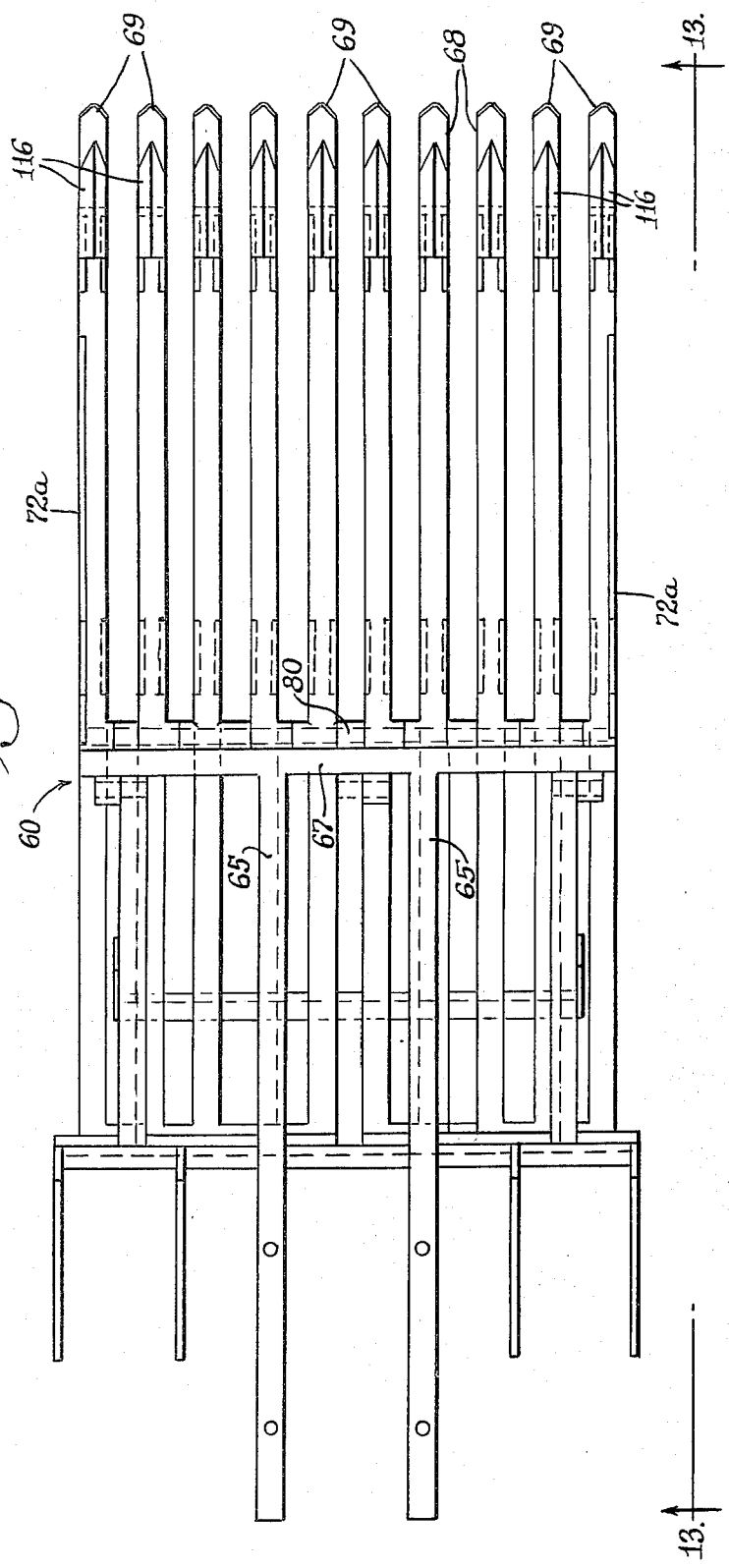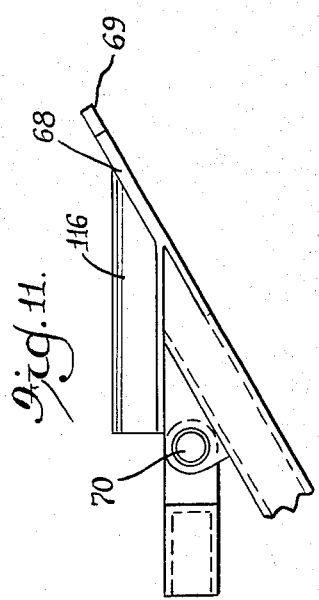

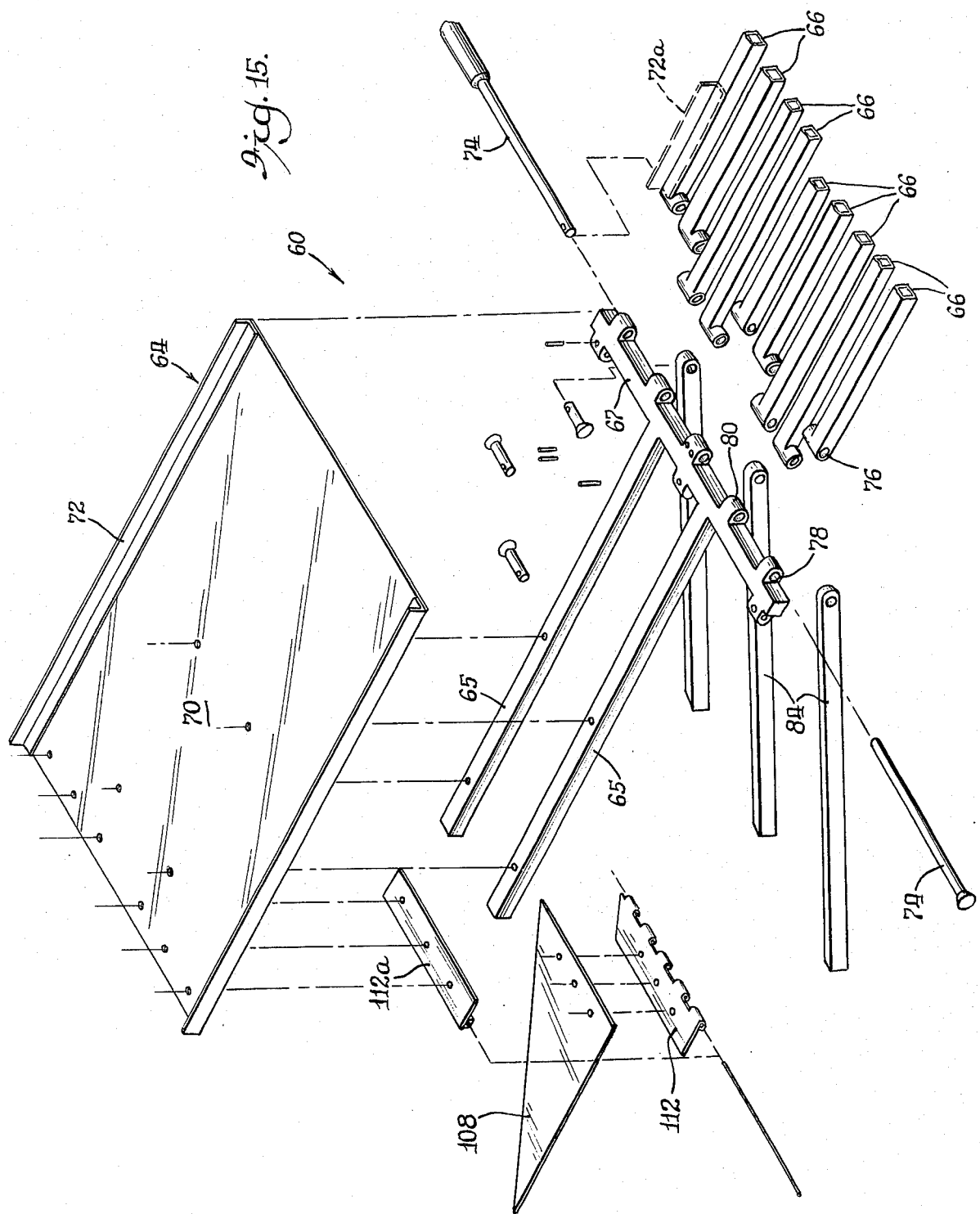

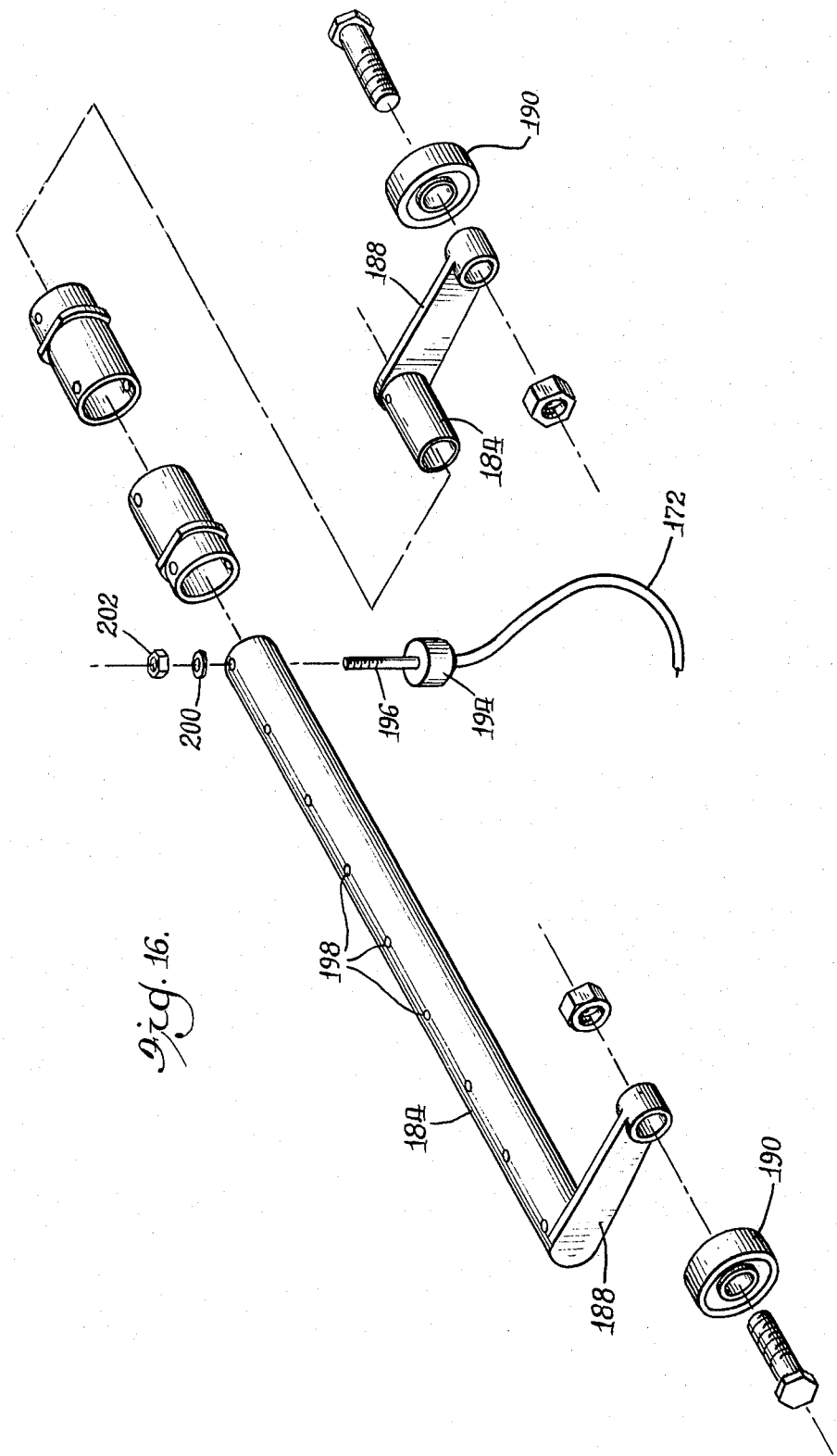

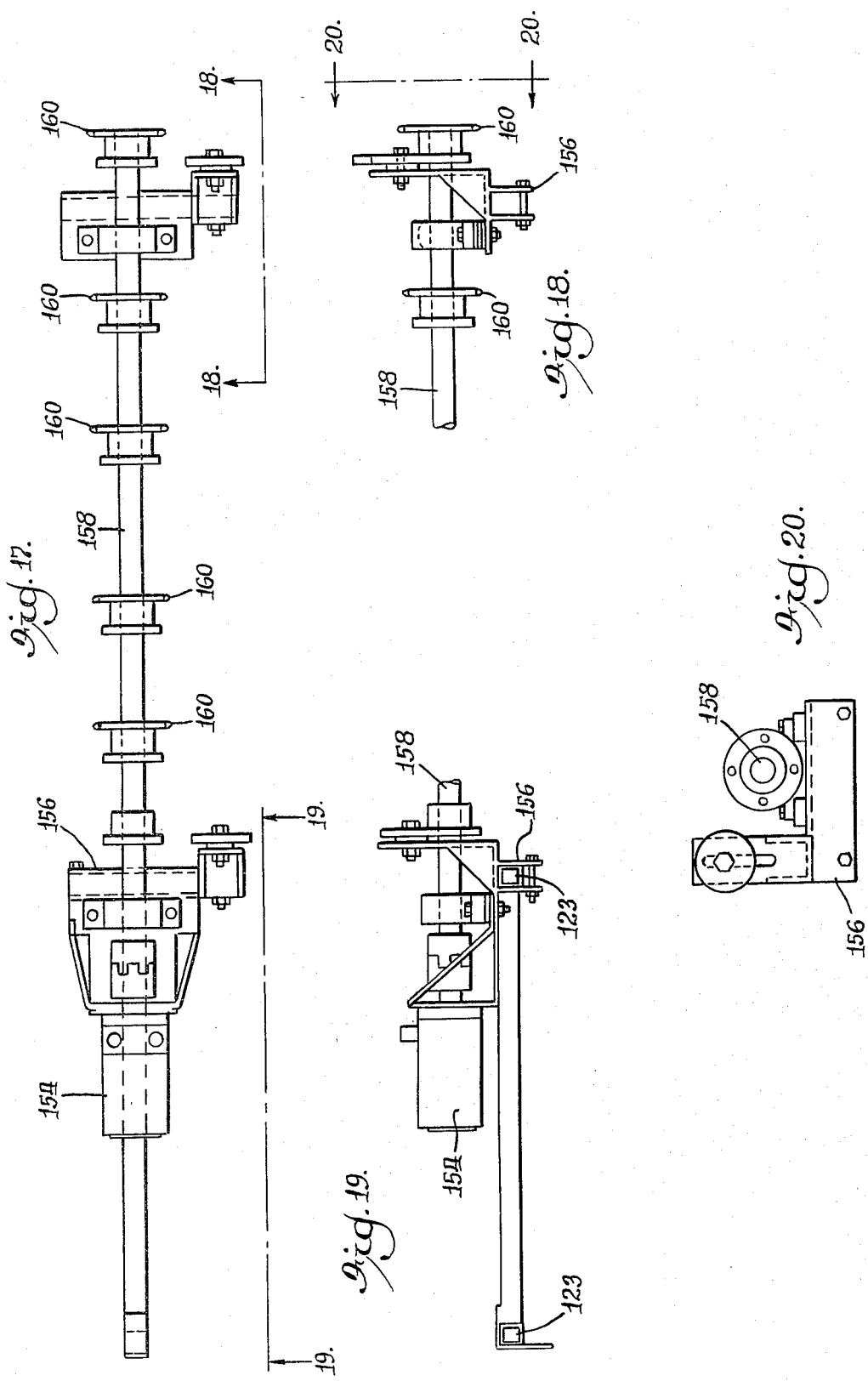

CORN HARVESTER COMBINE WITH MEANS FOR PICKING UP LOOSE EARS

BACKGROUND OF THE INVENTION

The present invention relates generally to a row crop harvester and particularly to an improved corn head to pick up loose ears from the ground.

Agricultural machinery has developed to the state where individual farmers can prepare, plant, tend and harvest great acreages of land. However, because of limitations inherent in the machinery itself, harvesting of certain crops is incomplete and inefficient, resulting in large quantities of valuable crops being left in the field and wasted. These unharvested crops have previously been considered as not completely wasted because they provided feed for wild game. However, the exploding costs of machinery, fuel and labor in bringing crops to harvest have made it essential to maximize harvest yields.

A prime example is in the harvesting of corn where conventional harvester combines effectively harvest corn attached to stalks, but do not pick up loose ears from the ground.

The scope of this problem is illustrated by studies conducted by the inventors in Kansas in 1982. They found that in an average year losses caused by loose ears which could not be picked up by conventional harvesting combines varied from one to twenty percent of the harvested yield. They determined that a realistic, conservative, average loose ear loss for the entire corn growing areas in Kansas would be at least seven percent of the total crop harvested. While this might be considered a normal loss for an average year, it could be increased to the point of economic ruin for a farmer heavily planted in corn during years of high corn borer or wind damage or a combination of both.

A modern corn harvester combine is a very efficient means of harvesting corn as long as it remains attached to the stalk, but it will not collect ears of corn that have fallen from the stalks before harvest, and it does a poor job picking up wind- or rain-lodged corn. Many farmers have been plagued by the problems of loose ears and lodged stalks. In the past, they have been forced either to leave the corn in the field, pick it up by hand, or graze livestock in the stubble to utilize the lost grain.

The inventors have conducted extensive literature searches which indicate that no machine has ever been produced that picked up both lodged corn and loose ears that had dropped to the ground. Applicants are aware of only one patent which even addresses the problem of picking up loose ears from the ground. This is Lange U.S. Patent No. 3,719,034 issued Mar. 6, 1973 on "Harvester Sweeper". No commercial application or availability of this particular machine is known. There is serious doubt that it would function effectively because the construction appears more likely to push ears of corn aside rather than pick them up.

SUMMARY OF THE INVENTION

Accordingly, it is a general object of this invention to provide an improved corn harvester or combine to pick up loose ears, or wind- or rain-lodged corn from the ground and harvest them. The invention may take the form of an attachment for a conventional harvester as is described here, or it may be built into a harvester originally, to supplement the action of the conventional stripper plates, gathering chains, and snapping rolls, thereby effectively harvesting ears which are lying loose or partially embedded or lodged in the ground, in addition to the usual recovery of ears from the upstanding stalks.

It is therefore a primary object of the present invention to pick up loose ears of corn lying on the ground which cannot be collected by a conventional harvester combine.

Basic features of the invention comprise a conveyor trough having a forward section consisting of horizontally spaced finger-like bars with vertically movable ground-engaging skid runners which pick up loose ears directly from the ground, and an overlying power driven reel with a plurality of rearwardly moving tines insertable between the skid runners and finger-like bars to engage the ears on the skid runners and move them rearwardly and upwardly along the conveyor trough into the machine.

Other objects and advantages will be apparent from the following description taken in conjunction with the accompanying drawings.

BRIEF DESCRIPTION OF THE DRAWINGS

FIG. 4 is an enlarged, fragmentary side elevational view of FIG. 1 taken on line 4—4;

FIG. 5 is a top plan view of FIG. 4;

FIG. 6 is a schematic view of a conventional corn harvester head;

FIG. 7 is a fragmentary enlarged side view of the forward portion of FIG. 4;

FIG. 8 is a top plan view of FIG. 7;

FIG. 9 is a perspective view of the conveyor trough mechanism;

FIG. 10 is a plan view of the conveyor trough shown in FIG. 9, with the discharge section plate removed to show the underlying supports;

FIG. 11 is a fragmentary enlarged view of FIG. 10 taken in the direction of the arrows 11—11;

FIG. 12 is a plan view of FIG. 11;

FIG. 15 is a fragmentary exploded view of the receiving section of the conveyor trough, and associated parts;

FIG. 16 is an exploded perspective view of one of the tubular cross bar assemblies including cam follower arms and rollers at the ends thereof, and one example of an ear pickup tine fastened to it;

FIG. 17 is a plan view of the hydraulic motor drive assembly and drive shaft taken in the direction of the arrows 17—17 in FIG. 4;

FIG. 18 is a fragmentary view of FIG. 17 taken in the direction of the arrows 18—18;

FIG. 19 is a fragmentary view of FIG. 17 taken in the direction of arrows 19—19; and FIG. 20 is a view of FIG. 18 taken in the direction of the arrows 20—20.

Like parts are referred to by like reference characters.

DETAILED DESCRIPTION OF THE PREFERRED EMBODIMENT

Figure 1:
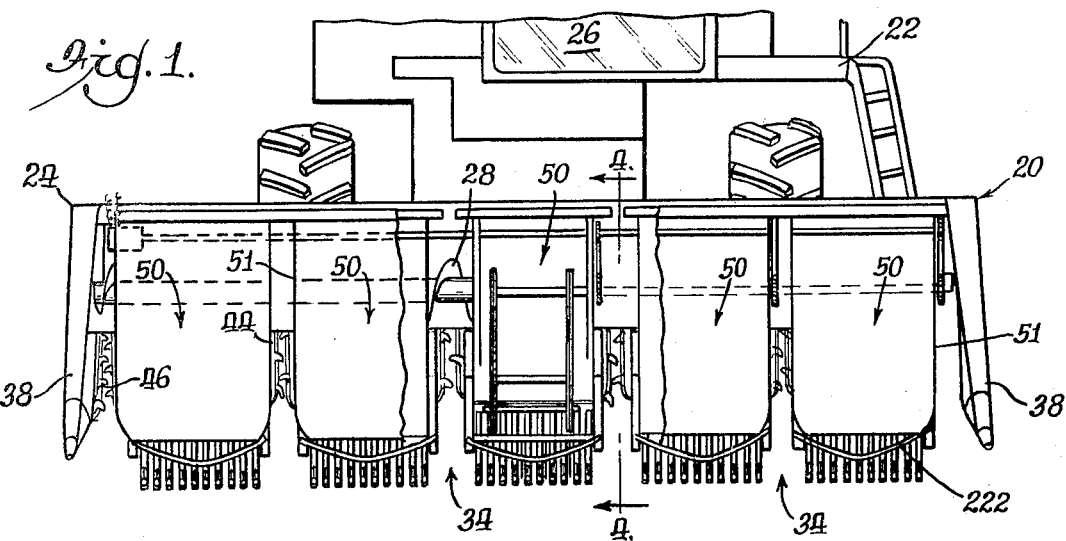
FIG. 1 is a front view of a conventional harvester combine with its corn head modified to include as an attachment the improvements of the present invention.

Referring now to the specific embodiment of the invention in the drawings, a corn head modified in accordance with the present invention is generally designated by the numeral 20 and is disposed on the forward end of a conventional harvester combine 22 which is partially illustrated.

The invention is easily adaptable to a variety of harvester combines including those of International Harvester, John Deere, Allis-Chalmers and others. Further, it is adaptable to multi-row machines of any size from small two-row combines up to twelve rows and larger. The machine 22 shown in the drawings is an International Harvester combine and the corn head 20 is an International Harvester Model 863 six-row corn head with certain parts removed and replaced by attachments made in accordance with the present invention.

The Model 863 has been illustrated as representative of conventional corn heads with which the present invention may be advantageously utilized. These conventional corn heads are well known so will not be described in detail. However, the basic features of the conventional corn head will first be described as background for the present invention. Briefly, as made originally and before modifications to include the present invention, it is shown in FIG. 6 and is representative of commercial corn heads having a corn head frame 24 mounted at the front of the power driven self-propelled harvester combine 22. The corn head is vertically adjustable by a hydraulic jack (not shown) under the control of an operator in the cab 26.

Figure 2:
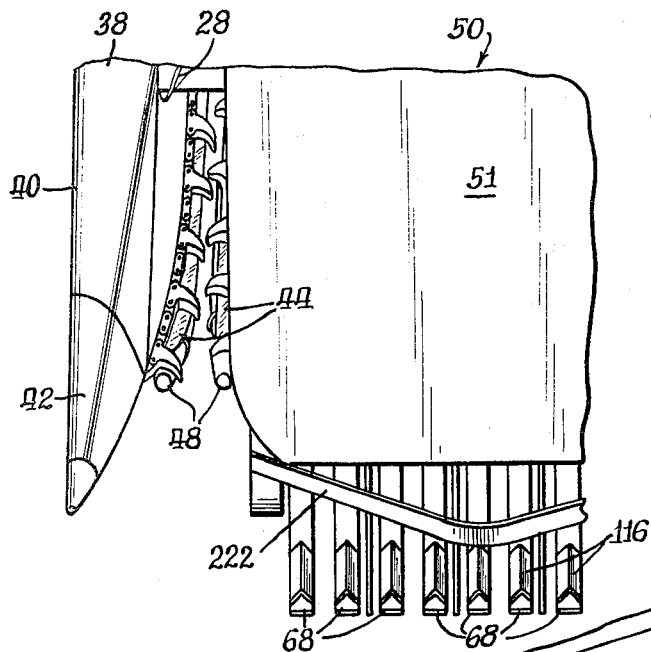
FIG. 2 is a fragmentary enlarged view of FIG. 1.
Figure 3:
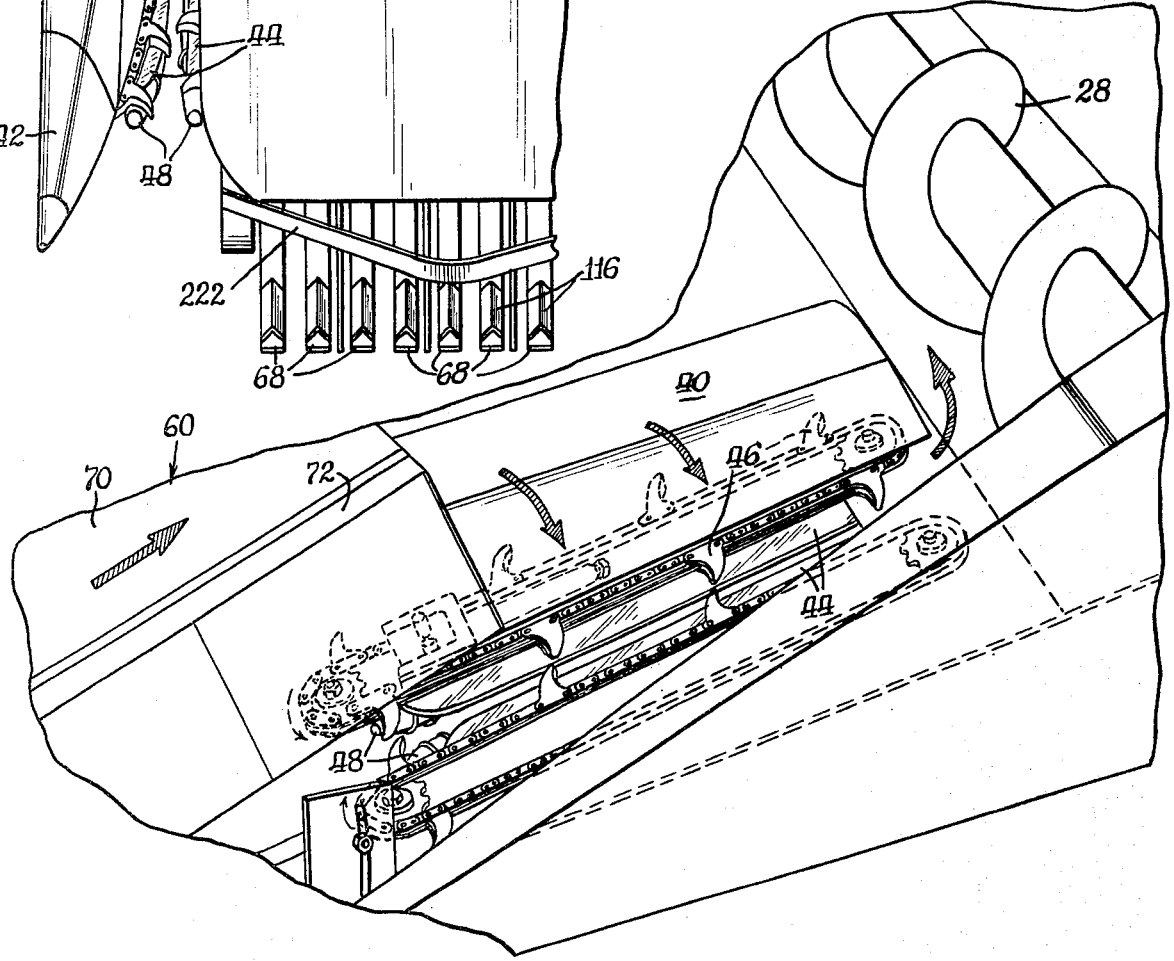
FIG. 3 is a fragmentary enlarged perspective view of the corn head showing the arrangement for transferring to the gathering chains loose ears picked up by this invention.
Figure 13:
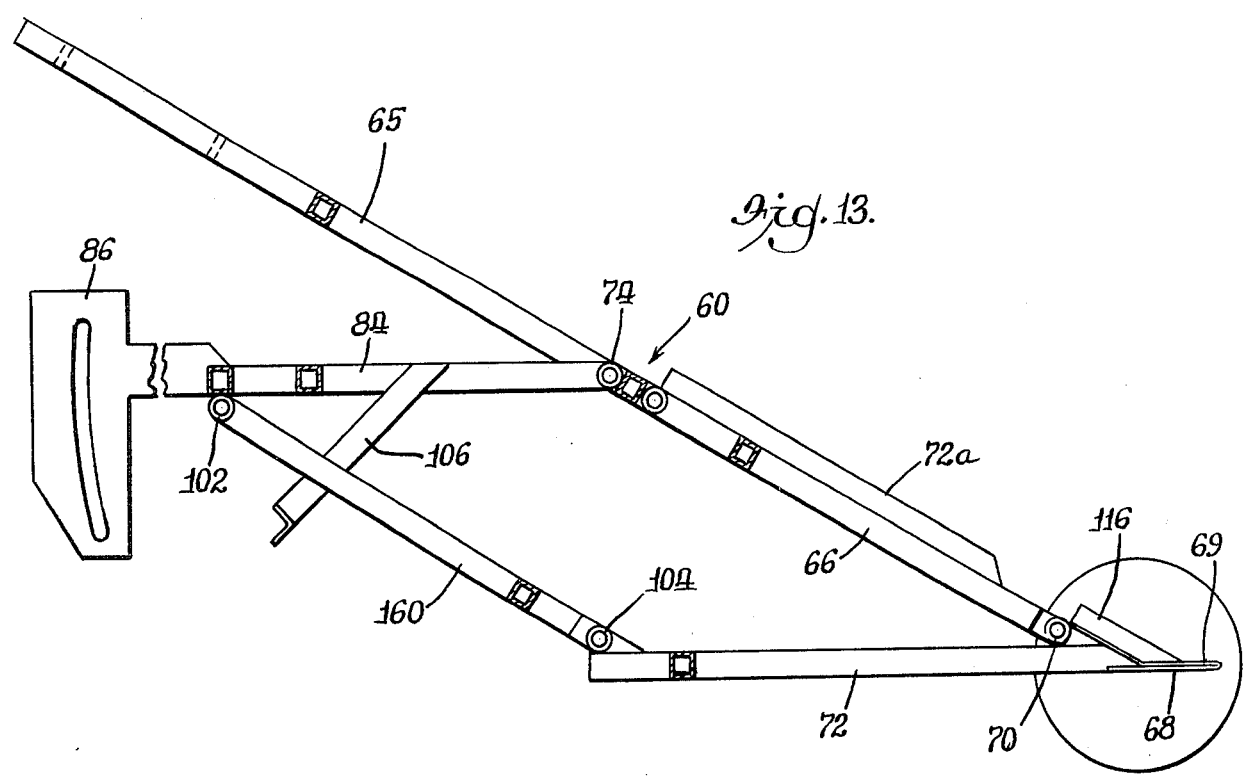
FIG. 13 is a side view of FIG. 10 taken in the direction of the arrows 13—13.
Figure 14:
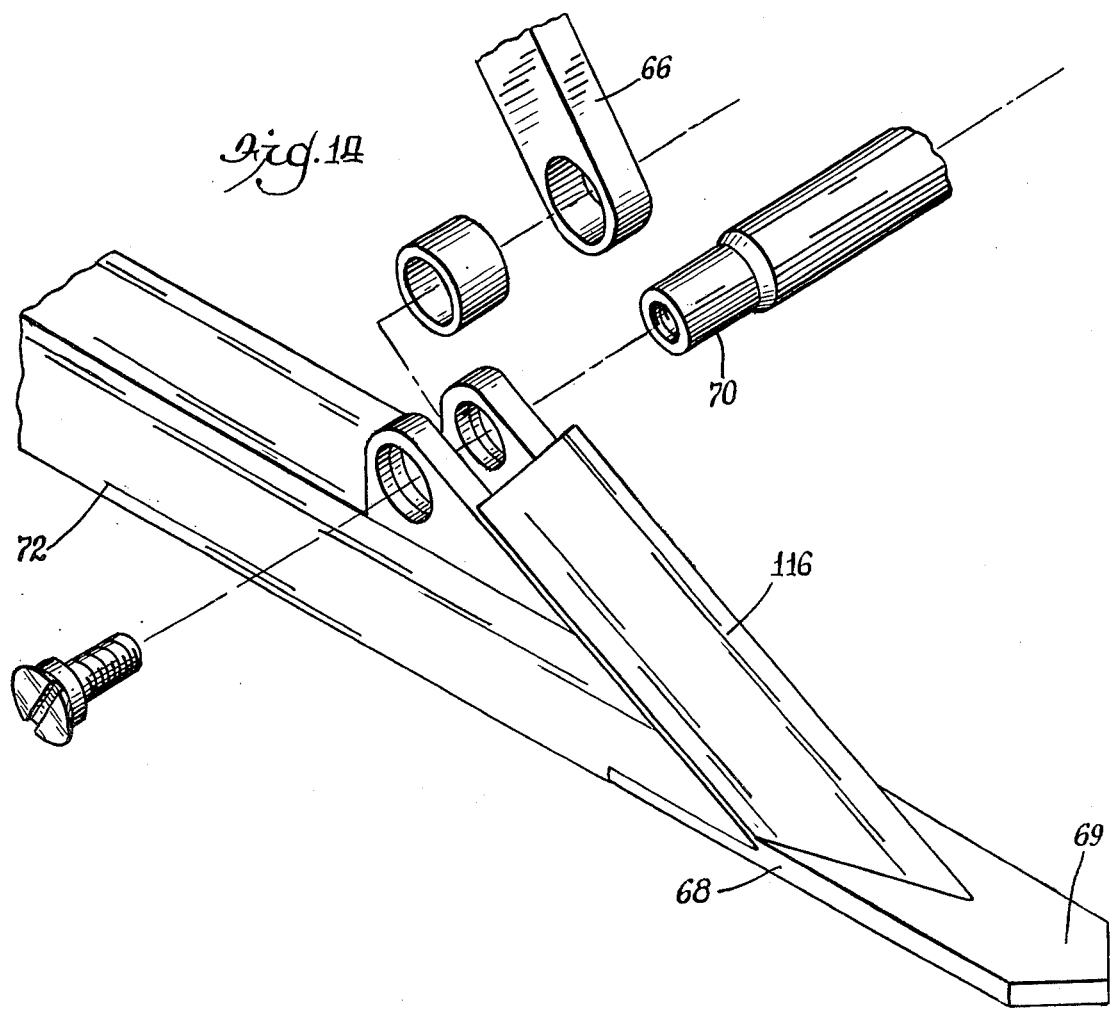
FIG. 14 is an enlarged, perspective, exploded view of one of the ground-engaging skid runners, and associated parts.

The conventional harvester combine shown in FIG. 6, and partially in FIGS. 1–4 has a transverse auger conveyor 28 supported in a trough on the corn head with opposed helical scrolls of opposite hand to move ears, stalks, etc., into the combine through a central inlet 30 for de-husking, shelling, cleaning and separating. The corn head frame 24 includes a forwardly-extending base portion 32 (FIG. 4) on which are mounted a plurality (in this case, seven) of row dividers defining a plurality (in this case, six) of throats 34 to be aligned with rows of corn when in use. Inner dividers 36 are located between adjacent throats 34. Outer dividers 38, narrower in plan view as shown in FIGS. 1, 2 and 6, are located at opposite sides of the head. Each divider 36 and 38 comprises a rear hood 40 fixed on the corn head base frame portion 32, and a forward, pointed snout portion 42 which may or may not be pivotally mounted on the hood, and may or may not have its pointed front end slidably engaged with the ground between the corn rows when in use.

Other conventional elements of the corn head frame best shown in FIGS. 1–4 include a pair of horizontally spaced stripper plates 44, 44 supported along or comprising part of the base portion 32, each pair of stripper plates being aligned with one of the throats 34. Pairs of gathering chains 46, 46 run rearwardly along the stripper plates, and pairs of snapping rolls 48, 48 are provided beneath the stripper plates.

In use, the conventional harvester combine moves parallel to the rows of corn which are guided into the throats 34 by the dividers. As the harvester advances, the corn stalks enter the spaces between the stripper plates 44, 44 and grabbed by the snapping rolls and pulled downwardly between the stripper plates. This "snaps" the corn ears off the stalks. The ears are then carried by the gathering chains 46, 46 rearwardly to the auger conveyor 28.

As stated, the above-mentioned elements of a conventional corn head, some of which cooperate with the present invention but which are not part of it, will not be described here in detail, for the sake of simplifying this description.

However, for more details, reference may be had to prior patents for descriptions of these elements as follows: Krenzel U.S. Patent No. 1,826,551 shows a screw conveyor 8, and Ashton et al U.S. Patent No. 3,271,940 shows a cross auger 52, which are comparable to auger 28. The Ashton et al patent discloses stripper plates 132 which are comparable to stripper plates 44, 44. Shriver et al U.S. Patent No. 4,048,792 shows gathering chains 24, 26, and Grant U.S. Patent No. 3,331,196 shows gathering chains 44, 52 and 54, which are comparable to gathering chains 46. And the Ashton et al patent shows snapping rolls 100, 100 which are comparable to snapping rolls 48.

It will be apparent that while the above described conventional stripper plates, gathering chains, and snapping rolls are quite effective in picking corn ears from standing stalks that are fed into the throats 34, they are not effective to pick up corn ears which have fallen off the stalks prior to harvest and are either loose or partly embedded and lodged in the ground. The present invention is specifically for that purpose and thereby augments the functions of the conventional corn harvester combine enabling the farmer to obtain a greater yield from his crop. It will now be described.

Referring to the conventional harvester shown in FIG. 6, the snout portions 42 of the five inner dividers 36 will be removed and replaced by five of the improved units each generally designated 50 shown in FIGS. 1, 2 and 5.

One of the units 50 will now be described in detail, it being understood that all five of these shown may be identical. The units 50 may have covers 51, or they may be used without covers.

A conveyor trough means, best shown in FIGS. 3, 9, 10, 13 and 15, is generally designated 60, and is supported on the forwardly extending base portion 32 of the corn head frame by any suitable means, one form of which will be described later herein. The conveyor trough means extends generally rearwardly and upwardly. It has a forward, lower level pickup and receiving section 62 and a rearward, higher level discharge section 64.

The pickup and receiving section 62 comprises an open grid of longitudinally extending finger-like bars 66 parallel to the direction of movement of the harvester. Each has a ground-engaging skid runner 68 pivotally connected to it by a pivot pin 70. Each skid runner has a forward lip 69 and an elongated rearward extension bar 72 which rides on the ground and prevents the skid member from tilting forwardly and digging in the ground.

Referring to FIG. 15, the discharge section 64 comprises a supporting framework including longitudinal bars 65 interconnected at the forward end by a transverse bar 67. This framework supports a flat plate 70 having upstanding side angle members 72 preventing loss of corn from the sides. Comparable side angle members 72a may optionally be provided on the outer finger bars 66 of the pickup and receiving section for the same purpose.

The pickup and receiving section 62 is pivoted for vertical movement relative to the discharge section 64 by horizontal, transverse pivot pins 74 extending through holes 76 and 78 in the finger-like bars 66 and ears 80 on bar 67 respectively. Thus, the finger-like bars 66 are free to move up and down independently of one another to accommodate local variations in ground level.

Parallelogram linkages generally designated 82 provide stability for the skid runners and enables them to remain level in all up and down positions. Each includes a fixed, horizontal mounting bar 84 fastened to a bracket 86 which in turn is fixed in any suitable way to the base portion 32. As illustrated here, there need be only two brackets 86, fastened respectively to opposite sides of the base portion 32 by means of upstanding brackets 88 fastened as by welding to base portion 32 and connected to brackets 88 by adjustable bolt and slot connections generally designated 90 (FIG. 4). Diagonal back bars 100 are pivotally interconnected at pivot pins 102 and 104 to brackets 86 and to the rear ends of runners 68 and extensions 72, respectively.

The horizontal spacings between pins 74 and 102, and between pins 70 and 104, are the same. Likewise, the spacings between 102 and 104, and between 74 and 70, are the same. Thus, a four-arm parallelogram linkage is provided for each skid runner 68 which enables it to remain level throughout a range of elevated positions. One or more diagonal braces 106 (FIGS. 4 and 13) engage the back bars 100 and limit the finger-like members 66 from dropping excessively in case the unit passes over a very deep rut, or is elevated in its entirety to clear the ground which lifts the corn head frame with respect to the combine 22.

At the outlet end of the discharge section 70 of the conveyor trough, there are two downwardly extending, generally triangular plates 108 (FIGS. 4 and 15). These are formed to fit over each side wall 110 of the divider hood 40. These enable corn ears which are conveyed to the end of the discharge conveyor to drop to the gathering chains 46 which will convey them rearwardly to the transverse auger 28. These guide plates 108 are best shown individually in FIG. 15 together with hinge-like connectors 112 and 112a which connect them to opposite sides of the discharge section plate 70. Plates 108, when assembled as shown, prevent loss of corn ears by rolling forwardly from the unit.

As shown in FIGS. 4, 9, 10, 13 and 14, angle members 116 may be attached as by welding to the front edges of the skid runners 68 to help lift corn ears off the ground and to restrain them from loss by sidewise movement off the pickup and receiving section 62.

An important part of the invention is a power driven chain reel, generally designated 114 (FIG. 4), which overlies the conveyor trough means 60 and picks up corn ears from the skid runners and moves them progressively upwardly and rearwardly along the pickup and receiving section 62 and the discharge section 64. This will now be described.

As best shown in FIGS. 4, 5 and 8, the reel 114 comprises an auxiliary frame 117 including a pair of outer longitudinal struts 118 with forward extensions 120 welded thereto. Diagonal straps 121 strengthen their interconnections. A further pair of longitudinal struts 122 are positioned inside struts 118 and 120 and are interconnected and rigidified by a number of transverse members including major ones designated 124, 16, 128 and 130. Diagonal rods or straps 134 (FIG. 8) within struts 122, 122 prevent the auxiliary frame from racking.

A pair of upright posts 136 are fastened to the rear ends of struts 118. These bear downwardly on the top of the hood 40 which is strengthened internally to take the load by vertical compression members 138 inside the hood which, in turn, bears on the corn head frame base portion 32.

As best shown in FIGS. 4 and 6, struts 123 extend rearwardly from struts 118 to the cross member 140 fastened to the top, rear wall 142 of the corn head frame.

Diagonal, overhead, rear tension straps or rods 144 are fastened between the top ends of posts 136 and back ends of the struts 123 adjacent the cross member 140. A pair of diagonal, overhead tension straps 146 with turnbuckles 148 extend forwardly from the tops of posts 136 to the ends of longitudinal struts 118. By loosening bolts 150 to release clamped connections between the struts 118 and pins 152 which extend from the sides of posts 136, the elevation of the reel auxiliary frame 117 may be adjusted by turnbuckles 148.

Referring to FIGS. 4, 17 and 19, a hydraulic motor 154 is mounted by a bracket 156 to one of the longitudinal struts 123. The motor is connected via hoses 157, 157 to a hydraulic power takeoff (not shown) on the harvester combine 22 and is controlled by the operator from the cab. A single motor 154 may be utilized for all five units 50 and may drive a single transverse shaft 158 which will have a drive sprocket 160 for each of the units 50.

A power drive chain 170 extends from each drive sprocket 160 to a corresponding driven sprocket 172 mounted on the end of shaft 174 rotatably journaled in auxiliary frame 117. A pair of conveyor drive chains 176, 176 are trained between conveyor sprockets 178, 178 (FIG. 5) on shaft 174, and conveyor sprockets 180, 180 on shaft 182 rotatably journaled at the forward end of auxiliary frame 117.

As shown in FIGS. 4 and 16, a plurality (six in this case) of round tubular cross bars 184 are rotatably journally supported across the conveyor chains 176. Pairs of steel bushings are fastened as by rivets or welding to the respective chains 176. One of the cross bars 184 is rotatably journaled within each corresponding pair of bushings 186. A Nylon or Teflon or other suitable anti-friction bearing (not shown) may be provided within the bushings to enable the cross bars to rotate easily.

Each cross bar 184 has a pair of transverse follower arms 188 at opposite ends. A follower roller 190 is rotatably journaled on each. A plurality of tines 192 are mounted to extend generally radially from each cross bar. These tines may be any suitable shape, for example, straight as shown in FIGS. 4 and 5, or arcuate as shown in FIG. 16. They are at suitable distances along the axes of the cross bars to enter the spaces between adjacent finger-like bars 66 in the conveyor trough pickup and receiving section 62. The tines may be connected to the cross bars in any suitable way as by welding or bolting. In the embodiment illustrated, each tine has a collar 194 and a threaded end portion 196 which extends through holes 198 in the cross bars and is held by lock washer 200 and nut 202.

Cam track members 204 (FIGS. 4 and 7) comprise curved, inwardly-open-sided channel members fastened at opposite sides of the front end portion of the auxiliary frame 117. These receive, engage, and guide the follower rollers 190 to control the rotated orientation of the cross bars 184 and thereby hold the tines 192 in predetermined positions extending outwardly of the paths of movement of the conveyor drive chains 176 from at least an entrance position 206, short of the forwardly extending lips 69 of the skid runners 68, to an exit position 208, short of the discharge conveyor section 70. A supporting strap 207 (FIGS. 4 and 7) is fastened as by welding between each exit end 208 of the cam members and the corresponding auxiliary frame strut 118.

Referring to FIGS. 4 and 7, upper and lower diagonal guide plates 210 and 212 engage the follower rollers 190 and guide them into the entrances 206. Each side strut member 118 of the auxiliary frame has a pair of adjustable slides 214 and 216 with idlers 218 and 220 mounted on the ends thereof and respectively engageable with the upper and lower runs of the reel conveyor chains 176. These are tensioning and training elements for the reel chains. Idlers 218 are located at the juncture between the receiving section 62 and the discharge section 70 of the conveyor trough means 60. They are movable to adjust the lower run of the corresponding reel chains 176, 176 toward and away from the discharge section 70 of the conveyor trough, thereby enabling the reel drive chains 176 to move the cross bars 184 upwardly and backwardly along the plate 40 of the discharge section 64, and parallel thereto, for substantially its entire length.

Use and operation is believed to be apparent from the above description. Briefly, when the harvester combine 22 with the corn head 20 modified in accordance with the present invention is moved across a corn field in a direction parallel to the rows of corn, the standing corn will be harvested in the conventional way by means of the stripper plates 44, gathering chains 46 and snapping rolls 48. In addition, as an extra bonus for the farmer, the units 50 will pick up the loose ears of corn which would ordinarily not be recovered. A V-shaped bracket 222 is connected as by bolts 224 (FIG. 8) across the front of each auxiliary frame to separate corn stalks and guide them into the throats 34.

The embodiment described and shown to illustrate the present invention has been necessarily specific for purposes of illustration. Alternations, extensions and modifications would be apparent to those skilled in the art. The aim of the appended claims, therefore, is to cover all such alterations and modifications as fall within the spirit and scope of the invention.

The embodiments of the invention in which an exclusive property or privilege is claimed are defined as follows:

1. In a mobile corn harvester combine having a corn head comprising a frame with a plurality of forwardly extending horizontally spaced throat portions adapted to be aligned with and moved along a plurality of rows of corn being harvested, a transverse auger conveyor behind the throat portions for conveying corn laterally toward processing mechanism in the machine, each of the throat portions having associated therewith conventional structure including a pair of horizontally spaced stripper plates with snapping rolls and rearwardly moving gathering chains for snapping corn ears from stalks and conveying them to the auger conveyor; means for collecting loose ears of corn from the ground and conveying them to the auger conveyor comprising:

a plurality of conveyor trough means supported by the corn head frame and located forwardly of the frame between adjacent rows of corn, each conveyor trough means extending in a generally rearwardly and upwardly direction and comprising a lower level pickup and receiving section and a higher level discharge section;

said pickup and receiving section having an open grid-like structure comprising finger-like bars parallel to the direction of movement of the harvester, and a ground-engaging skid runner at the forward end of each, each of the skid runners having a forwardly extending lip for picking up ears of corn from the ground, the finger-like bars being pivotally connected to the discharge section and to corresponding ones of the skid runners enabling the finger-like bars to move up and down in response to variations in ground level;

said discharge section comprising a plate having an inlet end portion positioned to receive ears of corn from the pickup and receiving section, and having an outlet end portion positioned to discharge ears of corn onto the gathering chains for transferring ears of corn therefrom to the auger conveyor;

a reel having an auxiliary frame supported by the corn head frame above each conveyor trough means, a pair of horizontally spaced conveyor drive chains trained between forward and rearward sprocket means on the auxiliary frame for orbital movement in a lower conveying run and an upper return run, and having a plurality of movable cross bars supported between the chains for rearward movement with the lower runs of the chains across the pickup and receiving, and discharge sections of the trough means;

power means for driving the conveyor drive chains;

each of the cross bars having a plurality of generally radially extending tines which fit within the spaces between at least some of the finger-like bars and corresponding skid runners to thereby fully engage ears of corn on the forwardly extending lips and move the ears rearwardly along the finger-like bars and transfer them to the discharge section; and said movable cross bars being effective as conveyor flights to convey ears along the discharge section to the outlet end thereof for transfer to the auger conveyor via the gathering chains.

2. In a mobile corn harvester combine, means for collecting and conveying loose ears of corn according to claim 1 in which the finger-like bars and corresponding skid runners are independently vertically movable.

3. In a mobile corn harvester combine, means for collecting and conveying loose ears of corn according to claim 1 in which the skid runners are elongated and each finger-like bar and corresponding skid runner are two bars in a four-bar parallelogram linkage supported on the corn head frame enabling the skid runners to maintain a uniform level condition throughout a range of elevated positions.

4. In a mobile corn harvester combine, means for collecting and conveying loose ears of corn according to claim 3 in which each four-bar parallelogram linkage comprises a pair of spaced parallel diagonal bars of equal length pivotally connected at their upper ends to the corn head frame at a pair of pivot points spaced a predetermined distance apart, and pivotally connected to the corresponding skid runner at another pair of pivot points spaced the same predetermined distance apart.

5. In a mobile corn harvester combine, means for collecting and conveying loose ears of corn according to claim 1 in which the reel is fixedly mounted relative to the corn head frame whereby the tines supported on the cross bars extend variable depths into the spaces between the finger-like bars depending on the elevated positions of the finger-like bars.

6. In a mobile corn harvester combine, means for collecting and conveying loose ears of corn according to claim 1 having means for adjusting the vertical spacing between the lower runs of the conveyor drive chains and the discharge section of the conveyor trough means thereby enabling the conveyor drive chains to move the cross bars along a path substantially parallel to the surface of the discharge section for substantially its entire length.

7. In a mobile corn harvester combine, means for collecting and conveying loose ears of corn according to claim 1 in which the cross bars are rotatably journaled on the conveyor drive chains, and cam and follower means is provided acting between the cross bars and the auxiliary frame for rotating each cross bar as it approaches the skid runners and finger-like bars, to thereby extend the tines between the skid runners and finger-like bars to move ears of corn from the skid runners along the finger-like bars in the grid-like receiving section, to the discharge section.

8. In a mobile corn harvester combine, means for collecting and conveying loose ears of corn according to claim 7 in which the conveyor drive chains have pairs of transversely aligned bushings connected thereto, with one of the cross bars being rotatably journaled in each pair of bushings.

9. In a mobile corn harvester combine, means for collecting and conveying loose ears of corn according to claim 7 in which the cam and follower means release the cross bars as they approach a transition zone between the pickup and receiving and discharge sections enabling said cross bars to rotate and allow the tines to follow the cross bars along the discharge section in the relatively restricted vertical space between the discharge section and the lower runs of the conveyor drive chains.

10. In a mobile corn harvester combine, means for collecting and conveying loose ears of corn according to claim 7 in which the cam and follower means comprises a follower arm extending transversely from at least one end of each cross bar, at least one cam track means at the forward end portion of each auxiliary frame, a follower member at the end of each follower arm engageable with the cam track means to maintain the cross bar in a rotated position for holding the tines radially outwardly of the paths of movement of the conveyor drive chains from at least a position short of the forwardly extending lips of the skid runners to a position short of the discharge section.

11. In a mobile corn harvester combine, means for collecting and conveying loose ears of corn according to claim 10 in which the follower member is a follower roller on the end of the follower arm, and the cam track means is an elongated open-sided channel member supported on the auxiliary frame and extending from an entrance at the forward end of the upper run of the conveyor drive chains, and around the forward sprocket means, to an exit at the lower run of the conveyor drive chains near the outlet end of the pickup and receiving section.

12. In a mobile corn harvester combine, means for collecting and conveying loose ears of corn according to claim 11 in which cam follower guide means is supported by the auxiliary frame ahead of said entrance to thereby align the follower roller with the cam track means as it approaches said entrance.

13. In a mobile corn harvester combine, means for collecting and conveying loose ears of corn according to claim 10 in which a follower arm with follower means thereon is provided at each end of each cross bar, and cam track means engageable therewith is provided at each side of the auxiliary frame.

14. In a mobile corn harvester combine, means for collecting and conveying loose ears of corn according to claim 1 in which a V-shaped bracket is connected to the auxiliary frame and extends in advance thereof to separate corn stalks and guide them into said throat portions as the machine advances.

15. In a mobile corn harvester combine, means for collecting and conveying loose ears of corn according to claim 1 in which the auxiliary frame is pivotally adjustable about its rear end relative to the corn head frame to thereby vary the adjusted position of the auxiliary frame relative to the conveyor trough means.

* * * * *